(12) United States Patent
Rieschl

(10) Patent No.: US 6,785,884 B1
(45) Date of Patent: Aug. 31, 2004

(54) SYMBOLIC DEBUG INTERFACE FOR REGISTER TRANSFER SIMULATOR DEBUGGER

(75) Inventor: Michael J. Rieschl, St. Paul, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/409,020

(22) Filed: Sep. 29, 1999

(51) Int. Cl.[7] .................................................. G06F 9/45
(52) U.S. Cl. ......................................... 717/129; 714/38
(58) Field of Search ................................. 717/125, 129, 717/135, 134; 714/38, 45

(56) References Cited

U.S. PATENT DOCUMENTS

| | | | | |
|---|---|---|---|---|
| 4,819,234 A | * | 4/1989 | Huber ........................ | 717/129 |
| 5,276,811 A | * | 1/1994 | Zifferer et al. .............. | 345/275 |
| 5,410,681 A | * | 4/1995 | Jessen et al. ................ | 703/27 |
| 5,412,799 A | * | 5/1995 | Papadopoulos .............. | 714/34 |
| 5,425,036 A | * | 6/1995 | Liu et al. ...................... | 714/25 |
| 5,457,797 A | * | 10/1995 | Butterworth et al. ........ | 709/320 |
| 5,548,717 A | * | 8/1996 | Wooldridge et al. ........ | 717/128 |
| 5,652,869 A | * | 7/1997 | Herdeg et al. ............... | 703/23 |
| 5,652,899 A | * | 7/1997 | Mays et al. .................. | 717/125 |
| 5,669,000 A | * | 9/1997 | Jessen et al. ................ | 717/127 |
| 5,784,552 A | * | 7/1998 | Bishop et al. ................ | 714/38 |
| 5,787,245 A | * | 7/1998 | You et al. ..................... | 714/38 |
| 5,815,653 A | * | 9/1998 | You et al. ..................... | 717/134 |
| 5,881,289 A | * | 3/1999 | Duggan et al. .............. | 717/125 |
| 6,026,503 A | * | 2/2000 | Gutgold et al. .............. | 714/45 |
| 6,067,638 A | * | 5/2000 | Benitz et al. ................. | 714/37 |
| 6,119,247 A | * | 9/2000 | House et al. ................. | 714/38 |
| 6,289,300 B1 | * | 9/2001 | Brannick et al. ............. | 703/28 |

OTHER PUBLICATIONS

Wahl et al., A Methodology and Distributed Tool . . . , 1988, IEEE, p. 98–105.*
Ndumu et al., Visualising and Debugging . . . , ACM, 1999, p. 326–333.*

\* cited by examiner

*Primary Examiner*—John Chavis
(74) *Attorney, Agent, or Firm*—Charles A. Johnson; Mark T. Starr; Crompton Seager Tufte, LLC

(57) ABSTRACT

A computer code debugging system. The computer code debugging system preferably includes a first computer and a second computer, but this is not required in all embodiments. The first computer may be, for example, a high performance mainframe system having hosting a simulator and debugger, and the second computer may be, for example, a lower cost generic personal computer or workstation that has superior graphic user interface (GUI) capabilities relative to the first computer. In some embodiments, the GUI on the second computer includes windows for displaying high level source code, corresponding computer machine language code, and/or corresponding machine code binary, as desired. The high level window and/or the computer machine language window may be used in some embodiments to interactively control the simulation of the machine code binary on the first computer, as desired.

29 Claims, 5 Drawing Sheets

SYMBOLIC DEBUG INTERFACE FOR REGISTER TRANSFER SIMULATOR DEBUGGER

FIELD OF THE INVENTION

The present invention is related generally to computers. More specifically, the present invention is related to debugging software for debugging computer code.

BACKGROUND OF THE INVENTION

Computers have a history and current scope extending much further than the personal computers which are more visible to the general public. Mid-range and large mainframe computers are far from obsolete, having many advantages over personal computers. Some advantages can include well tested operating systems, special purpose operating systems, robust fault tolerant operating systems, multiple processor support, redundancy support, reliability, real time operating systems, high throughput transaction processing support, multiple busses, and built in support for database management functionality.

One example of mainframe use includes transaction processing for banking transactions, automatic teller machine transactions, and electronic commercial transactions. Transaction processing requires robust, accurate, and predictable execution of tasks to avoid performing a task more or less than the desired number of times in the case of a failure. Real time processing can require graceful degradation of services when a component fails. Many of these features are promised for personal computers but have not been delivered, as evidenced by less than graceful and less than infrequent personal computer hangs and crashes.

Over a long period, even 20 or 30 years, many utilities and tools have been developed and incrementally improved upon to aid the users and vendors of such legacy computers. One set of tools includes simulators and debuggers. Simulators can simulate the execution of computer code, including machine code. Sometimes it is advantageous to provide a simulator a legacy computer to simulate the execution of the native machine code, rather than running the code directly on the legacy computer.

Simulation or emulation often involves step-by-step simulation of execution of native machine code by a typically larger number of machine code instructions. For example, 4 bytes of machine code, 0106 A34F, representing LOAD REGISTER 6 with the literal 16 bit hex number A34F may be simulated by 2 lines of a higher level language such as "C" and executed by 50 bytes of machine code. The simulator may include routines for accepting the machine code 0106 A34F and decompiling to generate a text string such as "LDIR6 0xA34F". The text string generation can provide a meaningful text string for any human using the tools. A compiler having symbolic debugging support can generate a cross-reference table relating high level source code to machine code.

Single-stepping a mainframe can be highly impractical, given the number of users normally supported. Even momentary use of an actual machine, having the state saved and restored, can require momentary use of the entire machine as the task to be debugged is single-stepped through one machine instruction. This can require a relatively large amount of overhead to save the entire machine state, execute one machine instruction, and restore the machine state. By using a simulator, the simulation task can be run as any other, non-privileged task, as the actual CPU and memory is not being executed, only a simulated version of the CPU and memory. Thus, even when machine code is being debugged on the same machine on which it is eventually to be run, use of a simulator allows for less intrusive access to the machine, which may be running other tasks.

Personal computers and workstations are ubiquitous and relatively inexpensive compared to legacy computers. The large numbers of machines sold creates a market enabling large numbers of software titles to be sold. In particular, pleasing and user friendly graphical window systems and graphical user interfaces (GUIs) have been developed and the cost spread over several million machines and computer programs sold. The large personal computer market makes development of programming and debugging tools economically feasible. In particular, symbolic debuggers and simulators having pop-up windows have been developed for personal computers and workstations. Debugging and single-stepping of computer programs can be performed in a cubicle on an inexpensive personal computer, and the results saved into files and even e-mailed or shared on a network, using other tools commonly found on a personal computer.

In contrast, debugging and simulator tools written for legacy computers have not been able to take advantage of the large number of tools for the personal computer. For example, a financial transaction processing mainframe typically does not run compatible with the Microsoft Windows™ operating system. While a windows type environment could be developed for the mainframe, the cost would have to be spread over a smaller number of machines and would not likely be a high priority project in any case. While a mainframe compiler and simulator could be developed to generate and simulate mainframe machine code on a personal computer, the cost would have to be spread over a small number of users, likely internal users. Such a product is not likely to be developed due to lack of market interest and market priorities.

What would be desirable therefore, is a system for utilizing existing personal computer tools and GUIs in combination with existing mainframe compilers, symbolic debuggers, and simulators. What would be advantageous are methods and software tools for debugging mainframe computer code on a personal computer or workstation using debugging tools residing on the mainframe.

SUMMARY OF THE INVENTION

The present invention includes a system for simulating a computer program in a first computer while controlling the simulation in a second computer. The first computer can include a compiler for compiling a high level source language module to a machine code binary module and a decompiler for decompiling the machine code binary module into human readable computer machine language text. The computer machine language can also be referred to as assembly language or a register transfer language. The computer machine language text can be assembled into the machine code binary in some embodiments and exists only for human reading in other embodiments. In some cases, the high level source language is compiled into a machine language, and is then compiled into a machine code binary. In these embodiments, a decompiler may not be desired unless decompilation to computer machine language on the fly is desired.

The first computer can also include an interactively driven simulator-debugger capable of simulating or emulating the execution of the machine code instructions in the machine code binary module. The simulator-debugger preferably includes a message receiver for receiving externally generated commands for controlling the simulator. Commands can include commands referencing either high level source language position, machine language position, or machine code binary position. In one embodiment, commands can be received referencing either high level language position or computer machine language position and respond in both high level language position and machine language position. This can enable windows displaying either high level or machine language to follow the simulated execution of the machine code binary. In one application, break point positions are received in either a high level language position or a machine language position, and, after the breakpoint is set, the status is reported back referencing both high level and machine language positions.

Preferably, a graphical user interface (GUI) is used to generate computer display windows including a high level language debugging window, a machine language debugging window, and a batch command window, primarily for initiating file transfers and loading of the simulator-debugger. In one embodiment, the GUI resides on the same computer as the simulator-debugger. In another embodiment, the GUI resides on a computer different from the computer executing the simulator debugger. In a preferred embodiment, the simulator-debugger executes on a high performance mainframe computer and the GUI resides on a generic personal computer or workstation. The first and second computers can be coupled through communication links to provide for interactive debugging and file transfer.

In one illustrative method, a high level source file is compiled on a first computer to a machine code binary module, and the machine code binary module is decompiled to a human readable machine language module. In some embodiments, the decompiler can operate in a batch mode to produce an entire file of machine language text or in an on-the-fly mode to generate the machine language corresponding to a currently executing machine code instruction. Preferably, a data structure is created having a mapping between machine code binary positions, machine language positions, and high level language positions.

In an illustrative debugging method, commands are sent from a second computer such as a workstation to a first computer such as a high performance mainframe. High level language source code can be edited on either the first or the second computer and transferred to the first computer. Commands can be sent from the second computer to the first computer to initiate the compilation, decompilation, and/or simulation. Once begun, the simulation-debugging can be controlled and monitored from either a high level language window or a machine language window in the second computer. In a preferred embodiment, the execution can be single-stepped or breakpointed from either the machine language window or high level language window and followed in both the high level language window and the machine language window.

DETAILED DESCRIPTION OF THE INVENTION

Figure 1:
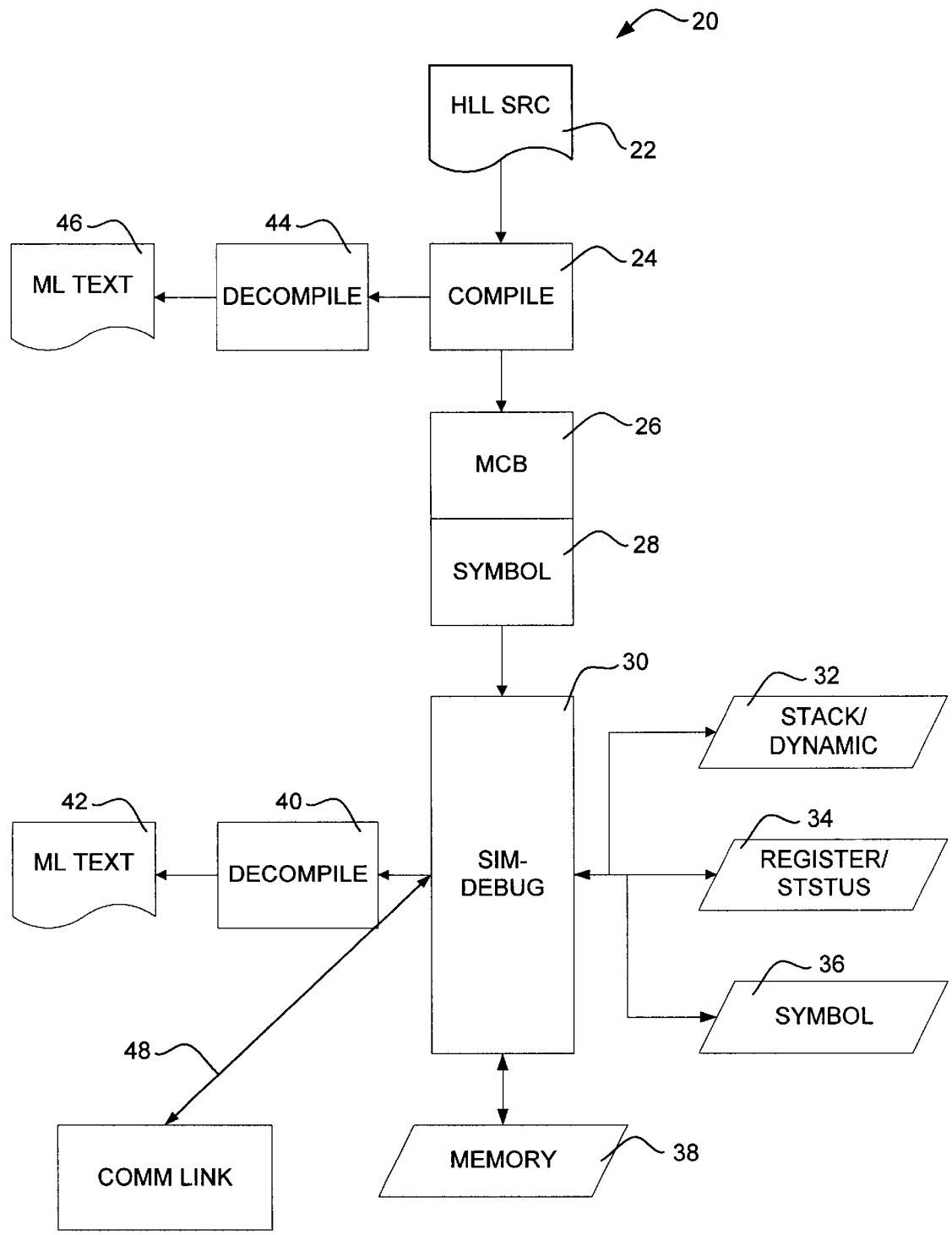
FIG. 1 is a block diagram of a program simulator-debugger environment in one computer such as a high performance mainframe or server.

FIG. 1 illustrates generally a system 20 for program development and simulating and debugging. In a preferred embodiment, simulator-debugger system (SIM-DEBUG) 20 runs on a single computer but in other embodiments is distributed over multiple computers. The Sim-Debug system can include a high level language (HLL) source file or module 22, which is typically a program source module written in a high level computer language such as C, Java, COBOL or some other high level language. The HLL source module can be used as input to a compiler 24 which can output a machine code binary (MCB) file or module 26 including a symbol table portion or symbolic debug portion 28.

The MCB module is an executable module having a plurality of machine code instructions executable by the computer. In one embodiment, the MCB module includes machine code for the Unisys 2200 computer. The MCB module typically includes system information as well as executable information, such as priority, privileges, and resources required to run the module. Symbolic debug portion 28 can include the textual names of variables and mappings to correlate source code line numbers to machine code instruction locations, where the machine code instruction locations can be coded as byte offsets from a starting location or a line numbers in an agreed upon format. In machines having variable length instructions or extended instructions, a byte offset may be more useful. The symbol table or another similar table located elsewhere can also include a mapping between machine code instruction location and corresponding machine language text file, discussed later.

MCB file 26 can be operated on and used as input by a simulator-debugger (Sim-Debug) program 30. The simulator-debugger can act as an interpreter of the machine code binary instructions found in the MCB. In one example, the Sim-Debug program is written to execute on the same machine that normally executes the machine language binary instructions. For example, a Sim-Debug program 30 interprets and simulates the execution of Unisys 2200 machine code binary instructions and executes on a Unisys 2200 as well. The Sim-Debug program is so named because the program preferably does not simply run in a batch mode, simulating or emulating the execution of a program from beginning to end. Instead, the program preferably can execute interactively, being single-stepped, multi-stepped, and breakpointed on instructions, traps, and variable accesses.

When executing, Sim-Debug program 30 can operate on a stack/dynamic area 32, a register/status area 34, a symbol table area 36, and/or a memory area 38. Stack 32 can simulate one or more stacks. The Sim-Debug program can also operate on memory heap areas in some embodiments supporting dynamic memory allocation. Symbol table area 36 can be used to dynamically update changes in symbol table information as well as store the information required for certain traps and breakpoints related to symbolic information. Memory area 38 can include static variable areas and array storage areas. In some embodiments, peripherals such as disc drives and monitors are simulated using memory storage. For example, operating system calls to disk services can be simulated by creating the disc files either in memory or on disk.

In some embodiments, the Sim-Debug program includes a decompiler 40 which can output a machine language text file or module 42. The machine language text file 42 may be written as a machine language module capable of being assembled and executed. Alternatively, the machine language text file 42 may be augmented with symbolic information. It is contemplated that decompiler 40 may operate primarily one instruction at a time, and output the machine language equivalent of the binary machine instruction currently being executed.

Alternatively, or in addition to, a second decompiler 44 may operate on MCB file 26 to output a machine language text file or module 46. Preferably, there is only one decompiler which serves the function of both decompilers 40 and 44 in FIG. 1. One reason for having a second decompiler 44 is to create a complete machine language text file at once rather than creating a machine language text output on the fly as each machine language binary instruction is executed. Machine language text file 46 can be created at compile time and stored as a complete file of machine language text. The complete file can be transferred to a remote computer if desired.

A communication link 48 can establish communication between Sim-Debug program 30 and one or more remote computers. In some embodiments, communication link 48 includes a first link for short, quick transmissions such as a Telnet link, and a second link for larger, batch type transmissions such as an FTP link. Communications link 48 can be used to handle interactive debugging commands, short decompiled machine language text packets, large decompiled programs, original high level source code, and responses to debug commands including the values of variables and current program counter or executing position. Communication link 48 can extend to another computer or to another task in the same computer.

Figure 2:
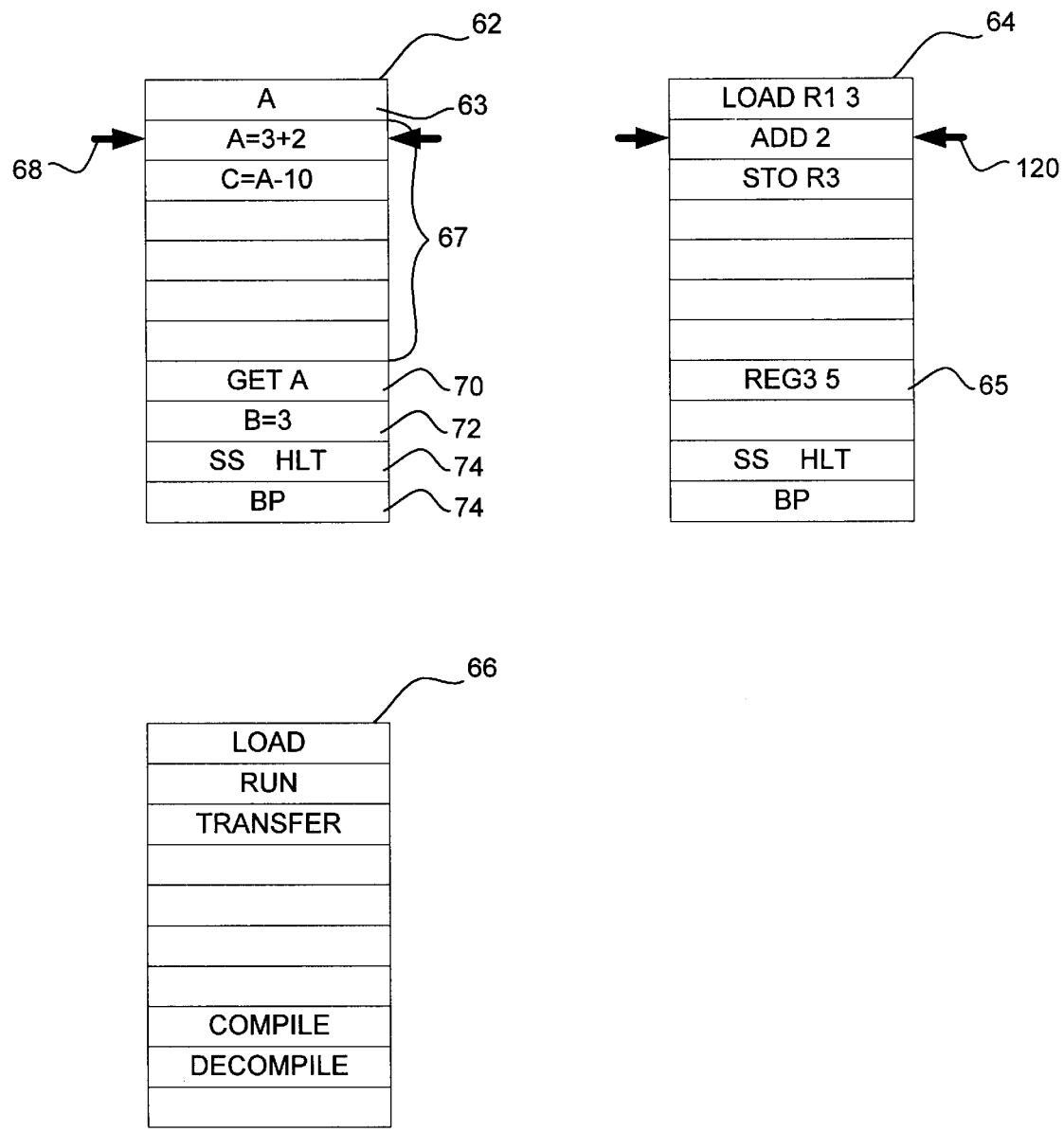
FIG. 2 is a highly simplified diagram of a computer display screen GUI such as a workstation GUI having a high level language window, a machine language window, and a command window.

Referring now to FIG. 2, a computer display screen 60 is illustrated, including a high level language (HLL) window or display area 62, a machine language window 64, and a command window 66. In one embodiment, the computer display screen is a CRT attached to a personal computer or workstation running a window supporting operating system. High level language window 62 allows display of the high level language source code corresponding to the machine code binary currently being executed. For example, a COBOL language source file can be shown which corresponds to a Unisys 2200 machine code module whose execution is currently being simulated. In the embodiment illustrated, HLL window 62 includes a symbol table portion 63 which can include the symbolic name of selected variables and the current direct or indirect value. In the illustrated diagram, the variable "A" is shown. Window 62 can also include a HLL source code portion 67 which can include a portion above and below a currently executed line 68. The currently executed line 68 can be highlighted or identified with a background or foreground color difference or highlighted by other indicia such as a pair of arrows as illustrated in FIG. 2. In some embodiments the displayed portion of HLL source code portion 67 can be selected by scrolling the window up and down. HLL window 62 can also include a command area such as a symbol value retrieval portion 70 and a symbol value setting portion 72 which can be used for setting the value of symbols interactively. Window 62 can also include command buttons 74 for functions such as single-stepping, halting, and breakpointing the simulation.

In use, HLL window 62 can be used to single-step, multi-step, and/or breakpoint on the HLL source code that corresponds to the machine instruction execution being simulated in the Sim-Debug program, which in some embodiments, is executing on another machine. These commands may be handled by grabbing any needed parameters such as symbol names or line numbers, and sending them to an interface between the communication link receiving task and the Sim-Debug program.

In one example, a "GET A" command, to retrieve the value of the symbol named A, is parsed from a window in a personal computer and shipped over to an accepting program which is running on a legacy machine such as a mainframe which is simulating the execution of a machine code binary program. The command and symbol, which can either be pre-processed or sent over as strings, is interpreted in a program running on the machine executing the Sim-Debug program. The received and interpreted commands and parameters can, in turn, be fed to existing functions on the legacy computer which had been written to service the Sim-Debug program executing on the legacy computer. When the function calls return values or perform the desired action, messages can be sent back to the HLL window on the other machine. The returned information can be displayed in a portion of HLL window 62, such as symbol table portion 63.

In this way, the sometimes-improved GUI of a first machine can be used to interface with the user, with the communication link and software interconnecting the first computer GUI with the second computer Sim-Debug program. One example of an action that can be performed with HLL window 62 is selecting a variable or symbol by swiping a cursor over the symbol, followed by clicking on a button to cause the value to be retrieved or another button to cause a breakpoint to be set when that variable is accessed. Another use of the HLL window is to highlight or select a line of HLL code, followed by clicking on a button to cause a breakpoint to be set at that line. One more illustrative use is selecting a variable followed by a button click, followed by entry of a value to be set for that variable.

ML window 64, which, in one embodiment, can be used to interactively debug and simulate execution of a MCB module. ML window 64 is illustrated having a highlighted or identified line 120 highlighted with a pair of arrows. ML window includes an interactive portion 65, similar to that illustrated for HLL window 62. In use, ML window 64 can monitor and control debugging and simulation using methods similar to those described above with respect to the HLL window 62. For example, ML statements can be highlighted, selected, and/or breakpointed. The values of registers and flags can be monitored. The simulated execution of the MCB module by the Sim-Debug program can be interactively controlled from either HLL window 62 or ML window 62. Thus the correspondence between the HLL module and ML text module can be observed and used to interactively monitor the machine code being simulated on a computer.

In command window 66, in one embodiment, primarily batch type commands are executed. In the example illustrated, window 66 includes buttons to initiate loading a MCB module into the Sim-Debug program, running a MCB module in the Sim-Debug program, transferring a file from a first computer to a second computer, compiling a HLL source file into a MCB module, and decompiling a MCB module into a corresponding machine language module. In one embodiment, most of the commands in command window 66 are higher level batch type commands rather than interactive commands used in debugging.

Figure 3:
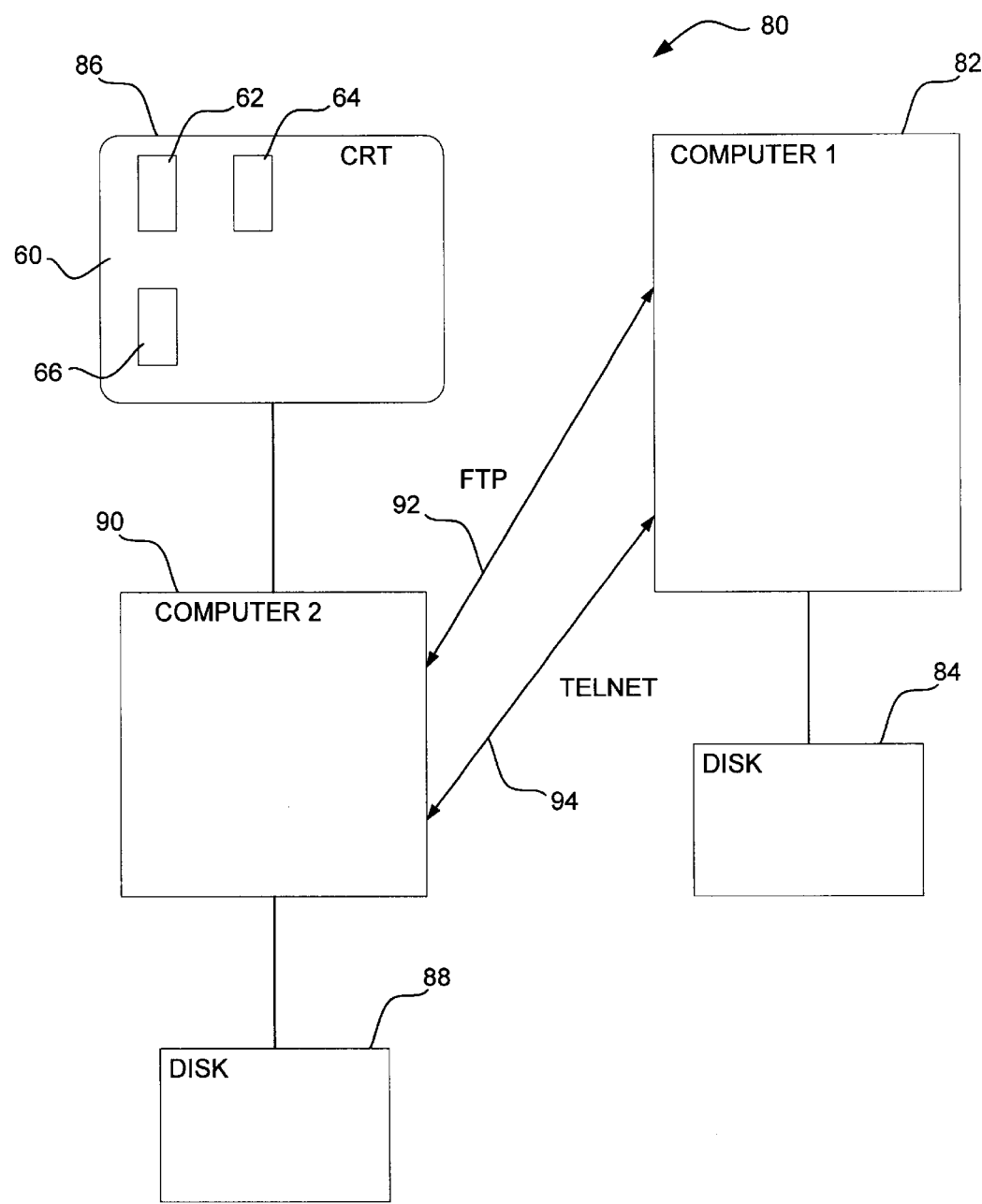
FIG. 3 is a highly diagrammatic overview of a computer system having a mainframe coupled through communication links to a personal computer having a GUI.

FIG. 3 illustrates a multi-computer system 80 including a first computer 82 and a second computer 86. In one embodiment, first computer 82 is a mainframe and second computer 86 is a personal computer or workstation. First computer 82 is illustrated having a bulk storage device 84 and second computer 86 is illustrated having a processor unit 90 coupled to display screen 60 and a bulk storage device 88. In the illustrative embodiment, first computer 82 is coupled to second computer processor unit 90 through a communication link including an FTP connection 92 and a Telnet connection 94. In one embodiment, first computer 82 executes the Sim-Debug program and second computer 86 executes GUI programs to interface with the Sim-Debug program.

Figure 4:
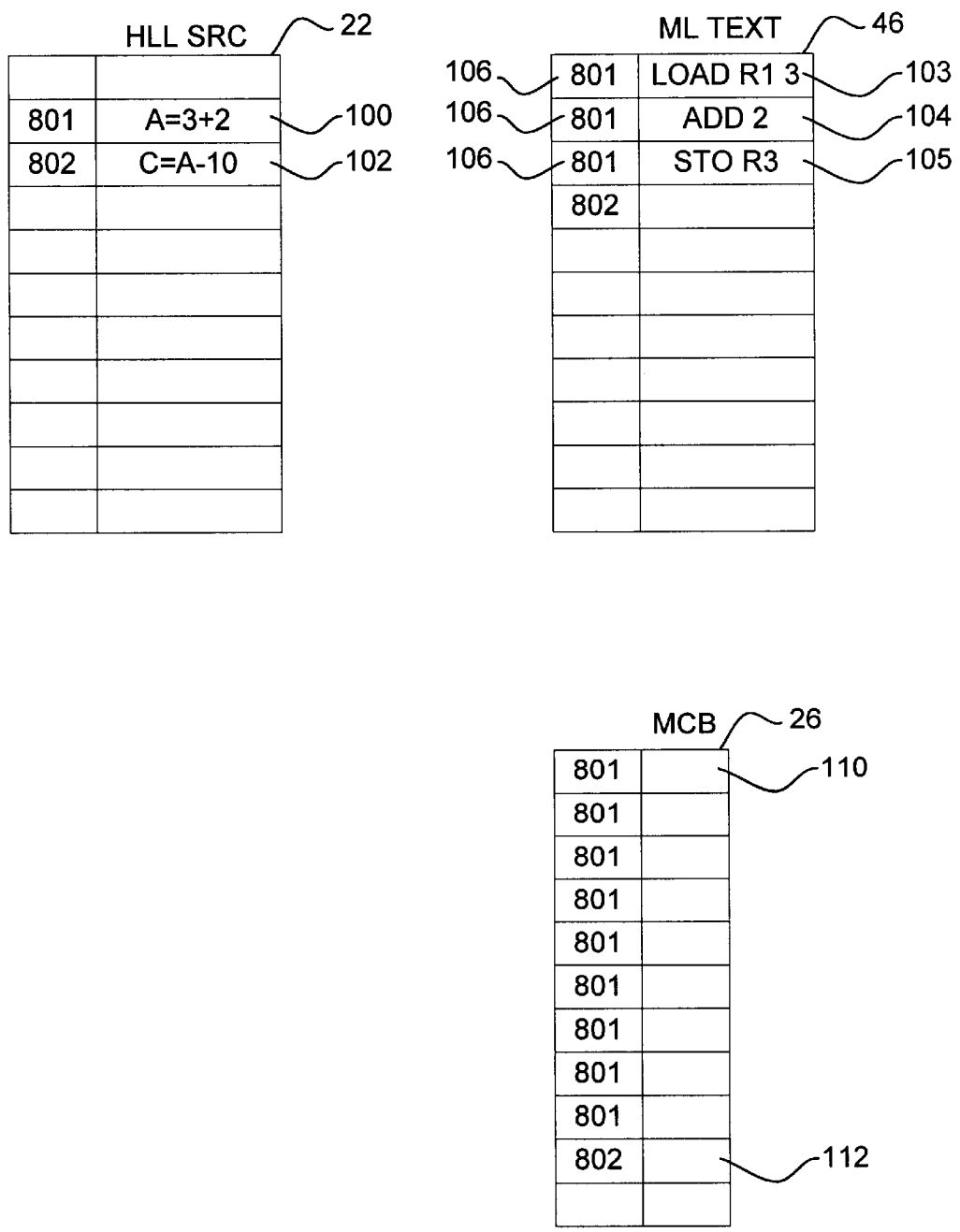
FIG. 4 is a simplified view of a high level language file, a machine language file, and a machine code binary file.

Referring now to FIG. 4, an example of mappings between HLL source module 22, machine language module 46, and machine code binary module 26 is shown. In the example illustrated, a first line 100 of HLL source has a line number 801 and second line of HLL source 102 has a line number 802. Machine language module 46 has a set of HLL line numbers mapped to the machine language line numbers, with three lines of machine language code 103, 104, and 105, all being mapped to HLL line number 801 as indicated at 106. MCB module 26 has a first machine instruction location at 110 mapped to HLL line number 801 and a second machine code instruction several locations away at 112 mapped to second HLL line number 802.

Any suitable mapping system for corresponding HLL to machine language to MCB locations can be used. In one embodiment, the machine code instruction locations are used as the lowest common denominator, with these numbers propagated in tables used with the HLL modules and the machine language modules. In another embodiment, the mappings are originally similar to those indicated in FIG. 4, and changed to a faster mapping mechanism such as pointers when the HLL module, machine language module, and MCB module are all loaded into the same machine.

In a preferred use of the invention, the first computer and second computer are different computers, for example a powerful, specialized mainframe and a less powerful, generic workstation. In another use of the invention, however, both computers are one in the same, with the compiler, decompiler, Sim-Debug program, and GUI programs executing on the same machine. In this example, the GUI portion and Sim-Debug portion may run in different areas of the same machine.

Figure 5:
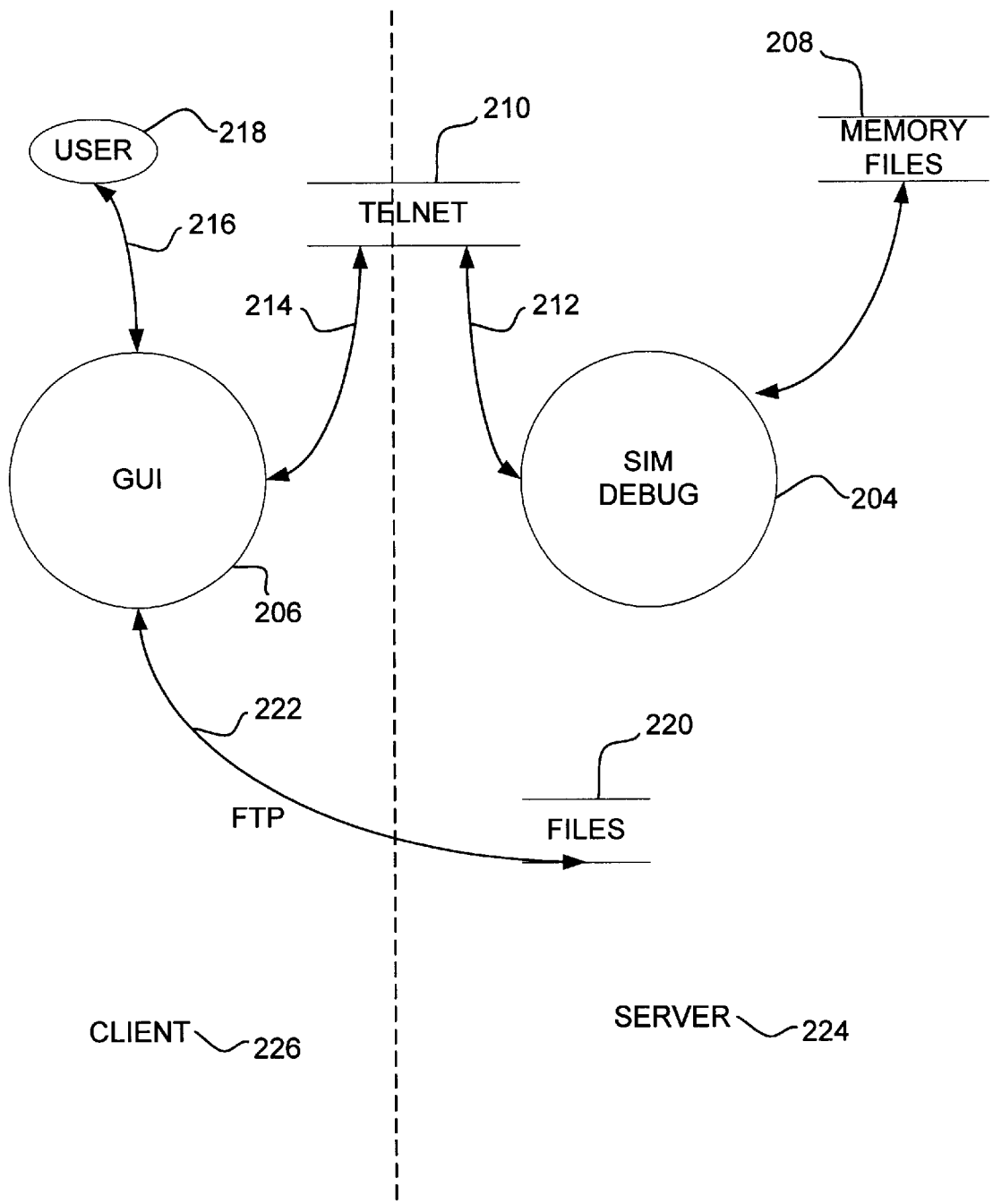
FIG. 5 is a simplified dataflow diagram of data flow between a simulator-debugger executing on a server and a GUI program executing on a client.

FIG. 5 illustrates, in a simplified dataflow diagram, dataflow between a server side 224 and a client side 226. Data files 208 such as machine code binary files can be sent to a Sim-Debug program 204 which operates on the files and, in turn, communicates using a Telnet link 210 through a local link 212 and a local link 214 on the client side. The client side can include what is generally referred to as a GUI program or programs 206, as the GUI or Windows functionality is the primary function of the program or programs. GUI 206 exchanges data with a user 218 through a communication medium 216, commonly a pop-up window allowing data selection and entry. GUI 206 can also communicate with files 220 located on the server side through an FTP link 222. In one embodiment, the client and server are located on distinct and dissimilar machines. For example, the server may reside on a high performance mainframe and the client may reside on a personal computer or workstation.

One important feature of the present invention is the use of a simulator to simulate execution of machine instructions rather than actual execution. As indicated above, single-stepping a mainframe can be highly impractical, given the number of users normally supported. Even momentary use of an actual machine, having the state saved and restored, can require momentary use of the entire machine as the task to be debugged is single-stepped through one machine instruction. This can require a relatively large amount of overhead to save the entire machine state, execute one machine instruction, and restore the machine state. By using a simulator, the simulation task can be run as any other, non-privileged task, as the actual CPU and memory is not being executed, only a simulated version of the CPU and memory. Thus, even when machine code is being debugged on the same machine on which it is eventually to be run, use of a simulator allows for less intrusive access to the machine, which may be running other tasks.

In accordance with the present invention, existing computer simulators and existing software can be leveraged. For example, an existing simulator may have function calls written in a high level language or assembly language for getting or setting symbol table values. The functions typically have parameter lists. To run the equivalent functions from a remote computer, the functions can be emulated with stub functions which may simply pass the function names and parameter lists to the local computer running the simulator. Server software can obtain the function names and parameter lists and call the previously written functions, and any returned values may be sent to the remote computer.

The use of personal computers as GUI devices to access high performance mainframes is only one example of the present invention. In general, the present invention includes the use of both high level language and machine language windows to control and view the simulated execution of machine code instructions by a simulator or emulator. The present invention can be used in any application where simultaneous viewing and control of high level language and machine language execution simulation is desired.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for simulating a computer program execution using a first computer and a second computer, the method comprising the steps of:

providing a high level computer language representation of the computer program;

providing a machine code binary executable that corresponds to the high level computer language representation of the computer program;

identifying a correspondence between at least selected instructions of the machine code binary executable and one or more instructions of the high level computer language representation of the computer program;

executing a debugging simulator on the first computer for receiving the machine code binary and for simulating execution of said machine code binary;

executing a graphical user interface on the second computer for displaying output and for accepting human input, the graphical user interface displaying the identified correspondence between at least selected instructions of the machine code binary executable and the one or more instructions of the high level computer language representation of the computer program; and interactively controlling simulation of said machine code binary on said debugging simulator via said graphical user interface on the second computer.

2. A method for simulating a computer program execution as recited in claim 1, further comprising:

providing a computer machine language representation of the machine code binary;

displaying at least a portion of the computer machine language representation in the graphical user interface on the second computer; and selectively stepping through said simulated execution of the machine code binary on said first computer using the computer machine language representation in said graphical user interface on the second computer.

3. A method for simulating a computer program execution as recited in claim 1, further comprising:

transferring at least part of the high level computer language representation to said second computer from said first computer, said machine code binary being compiled from said high level computer language representation;

displaying at least part of said high level computer language representation in said graphical user interface on the second computer; and indicating in said graphical user interface a currently executing portion of said high level computer language representation that corresponds to a currently executing portion of said machine code binary.

4. A method for simulating a computer program execution as recited in claim 2, further comprising the steps of transferring at least part of the high level computer language representation to said second computer, said machine code binary being compiled from said high level computer language representation, wherein said graphical user interface includes at least a first window for showing at least a portion of said high level computer language representation and a second window for showing at least a portion of said computer machine language representation.

5. A method for simulating a computer program execution as recited in claim 4, further comprising the step of stepping through at least part of said high level computer language representation in said first window which then controls said simulator on said first computer while displaying a corresponding portion of said computer machine language code in said second window on the second computer.

6. A method for simulating a computer program execution as recited in claim 4, further comprising the step of controlling said debugging simulator by selecting selected portions of the high level computer language representation in the first window.

7. A method for simulating a computer program as recited in claim 4, further comprising the step of controlling said debugging simulators by selecting selected portions of the computer machine language code in the second window.

8. A method for simulating a computer program execution as recited in claim 4, further comprising the step of stepping through said computer machine language code in said second window which then controls said debugging simulator on said first computer while displaying a corresponding portion of said high level computer language representation in said first window.

9. A system for simulating a computer program execution on a first computer while interactively controlling said simulation from a second computer comprising: a first computer having a simulator debugger executing therein, wherein the debugging simulator is capable of simulating execution of a machine code binary, said simulator debugger receiving remotely generated commands and returning responses;

a second computer having a graphical user interface, and capable of accepting user simulator-debugger commands and providing remotely generated commands, the graphical user interface displaying a high level language source code and/or a computer machine language code that corresponds to said machine code binary; and at least one communication link between said first and second computers for transferring said remotely generated commands to said symbolic simulator debugger on said first computer and for returning the responses from said simulator debugger, said at least one communication link also for transferring one or more of the machine code binary, the high level language source code and/or the computer machine language code from the second computer to the first computer for execution on the first computer.

10. A system for simulating a computer program execution as recited in claim 9, further comprising a compiler on said second computer for compiling the high level language source code to said machine code binary module.

11. A system for simulating a computer program execution as recited in claim 10, wherein said machine code binary includes instructions having locations and said high level language source code includes lines of source code having locations, wherein said system includes a data structure for correlating said machine code binary locations to said high level language source code locations.

12. A system for simulating a computer program execution as recited in claim 11, further comprising a routine for receiving a currently executing machine code binary instruction location from said first computer and using said data structure to identify said corresponding high level language source code location on said second computer graphical user interface.

13. A system for simulating a computer program execution as recited in claim 10, further comprising a routine on said second computer for stepping through said high level language source code in said graphical user interface on said second computer and causing said simulator-debugger to step through corresponding machine code binary on said first computer.

14. A system for simulating a computer program execution as recited in claim 10, further comprising a routine executing on said second computer for selectively stepping through said computer machine language code in said graphical user interface on the second computer and causing said simulator debugger to step through corresponding machine code binary on the first computer.

15. A system for simulating execution of a machine code binary having a number of instructions compiled from a high level computer language having a number of instructions, comprising:

a simulator for simulating execution of said machine code binary;

means for providing a computer machine language representation that correspond to the machine code binary;

a translator for providing a translation between an instruction position in said high level computer language, a corresponding instruction or set of instructions in said computer machine language representation, and a corresponding instruction or set of instructions in said machine code binary;

a message receiver for receiving externally generated commands for said simulator; and a command processor for accepting said received externally generated commands and providing said externally generated commands to said simulator.

16. A system for simulating execution of a machine code binary as recited in claim 15, further comprising a high level computer language position indicator for indicating a position in the high level computer language that corresponds to a currently executing machine code binary position.

17. A system for simulating execution of a machine code binary as recited in claim 15, further comprising a computer machine language position indicator for indicating a position in the computer machine language representation that corresponds to a currently executing machine code binary position.

18. A system for simulating execution of a machine code binary as recited in claim 15, further comprising a high level computer language position indicator for indicating a position in the high level computer language that corresponds to a currently executing machine code binary position and a computer machine language position indicator for indicating a position in the computer machine code representation that corresponds to the currently executing machine code binary position.

19. A method for interactively simulating execution of an executable machine code binary having internal locations compiled from a higher level computer-language having internal locations, the method comprising:

providing a simulator-debugger for interactively simulating execution of the machine code binary;

providing a first computer display region for displaying simulated execution of the high level computer language;

providing a second computer display region for displaying simulated execution of a computer machine language representation that corresponds to the machine code binary, said computer machine language also having internal locations;

providing a communication channel between said first and second computer display regions and said simulator-debugger;

sending commands related to a particular computer machine language internal location from said second computer display region to said simulator-debugger;

determining a high level computer language internal location corresponding to said particular computer machine language location;

sending responses to said commands relating to said corresponding high level computer language internal location from said simulator debugger to said first high level computer language display region; and changing said displayed high level computer language region in response to said responses to said commands.

20. A method for interactively simulating execution of executable machine code as recited in claim 19, wherein said first and second computer display regions are generated by software executing on a first computer.

21. A method for interactively simulating execution of executable machine code as recited in claim 19, further comprising a second computer wherein said first and second computer display regions are generated by software executing on said second computer.

22. A method for interactively simulating execution of executable machine code as recited in claim 19, wherein said commands include a single-stepping command such that single-stepping in said computer machine language representation region causes a corresponding high level language location to be indicated in said first computer display region.

23. A method for interactively simulating execution of executable machine code as recited in claim 19, wherein said commands include a breakpointing command such that breakpointing on a computer machine language location in said second computer display region causes a corresponding high level language location to be indicated in said first computer display region.

24. A method for interactively simulating execution of executable machine code binary having internal locations comprising:

providing a simulator-debugger for interactively simulating execution of the machine code binary on a first computer;

providing a first interactive computer display region for displaying and controlling simulated execution of a high level computer language having internal locations, the machine code binary being compiled from the high level computer language;

providing a second interactive computer display region for displaying simulated execution of a computer machine language representation of the machine code binary, said computer machine language representations having internal locations;

providing a communication channel between said first and second computer display regions and said simulator-debugger;

sending commands related to said high level computer language location from said first computer display region to said simulator-debugger;

determining a computer machine language representation location that corresponds to said high level computer language location;

sending responses to said commands relating to said corresponding computer machine language representation location from said simulator debugger to said second computer display region; and changing said second computer display region in response to said sent responses.

25. A method for interactively simulating execution of executable machine code binary as recited in claim 24, wherein said first and second computer display regions are generated by software executing on said first computer.

26. A method for interactively simulating execution of executable machine code binary as recited in claim 24, further comprising a second computer wherein said first and second computer display regions are generated by software executing on said second computer.

27. A method for interactively simulating execution of executable machine code binary as recited in claim 24, wherein said commands include single-stepping commands such that single-stepping in said first computer display region causes a corresponding computer machine language location to be highlighted in said second computer display region.

28. A method for interactively simulating execution of executable machine code binary as recited in claim 24, wherein said commands include breakpointing commands such that breakpointing on a line in said first computer display region causes a corresponding computer machine language location to be highlighted in said second computer display region.

29. A debugger for debugging a computer programs written in a high level computer language, the computer programs having a number of high level instructions compiled to a number of corresponding lower level instructions, comprising:

means for displaying a currently executing high level instruction;

means for displaying one or more a corresponding lower level instruction;

means for controlling the execution of one or more of the lower level instructions and/or one or more of the high level instructions.

\* \* \* \* \*

UNITED STATES PATENT AND TRADEMARK OFFICE
CERTIFICATE OF CORRECTION

PATENT NO. : 6,785,884 B1
DATED : August 31, 2004
INVENTOR(S) : Michael J. Rieschl It is certified that error appears in the above-identified patent and that said Letters Patent is hereby corrected as shown below:

Column 13,
Lines 1 and 3, the term "programs" should read -- program --.

Signed and Sealed this

Ninth Day of November, 2004

JON W. DUDAS
*Director of the United States Patent and Trademark Office*